Patented Nov. 26, 1946

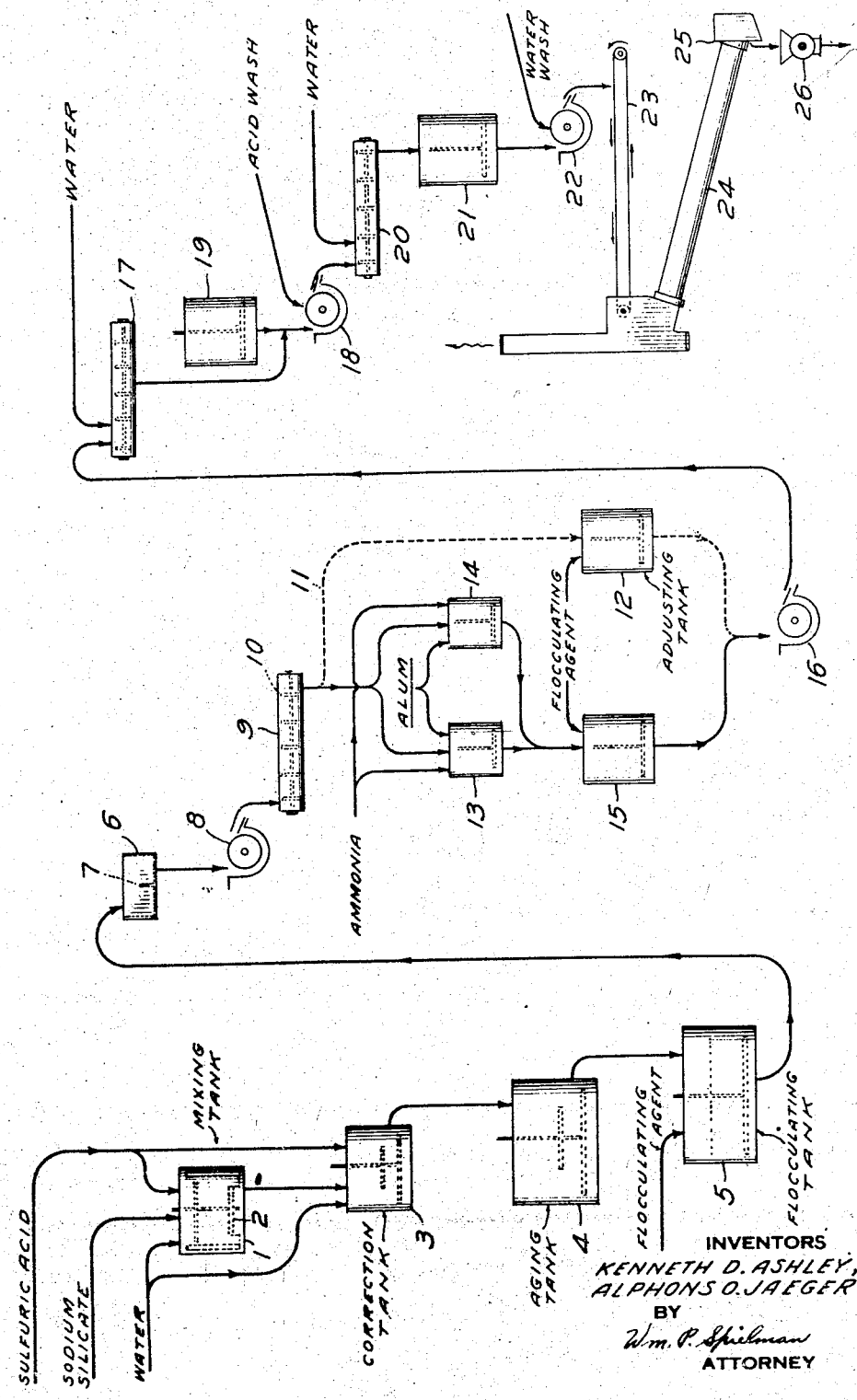

2,411,820

UNITED STATES PATENT OFFICE 2,411,820

MANUFACTURE OF CATALYSTS

Kenneth D. Ashley, Noroton, and Alphons O. Jaeger, Greenwich, Conn., assignors to American Cyanamid Company, New York, N. Y., a corporation of Maine Application September 22, 1942, Serial No. 459,262

2 Claims. (Cl. 252—250)

This invention relates to the manufacture of catalysts, and more particularly to the manufacture of gel-type catalysts containing oxides or hydrous oxides of metals of the third and fourth groups of the periodic system. While the principles of the invention may be applied to the production of gel-type catalysts for any purpose, they are particularly useful in the manufacture of cracking catalysts, dehydration catalysts and dehydrogenation catalysts of any desired particle size, such as those employed for the catalytic dehydrogenation or cracking of petroleum fractions for the production of butadiene or of high octane gasoline and those used for dehydrating glycols such as 1,4-, 2,4- or 2,3-butylene glycols to butadiene.

An important class of gel-type catalysts in wide commercial use for dehydrogenation and cracking reactions are silica catalysts prepared by precipitating hydrated silica from waterglass solutions. Alumina-silica, alumina-titanium-oxide-silica and alumina-zirconium oxide-silica catalysts are produced by precipitating solutions containing aluminum or mixtures of alumina with zirconium or titanium on a precipitated silica hydrogel. Representative catalysts of the first class are described in U. S. Patents Nos. 2,285,314 and 2,287,917. It is a principal object of the present invention to provide an improved method for the manufacture of catalysts of these classes, which process is especially adapted to the large scale manufacture of gel-type catalysts of high efficiency. In their broader aspects, however, some of the features of the present invention are applicable to the manufacture of any gel-type catalyst consisting of or comprising active silica.

Gel-type catalysts containing active silica should be substantially free from alkali metal compounds and other water-soluble salts that might act as a flux in the finished catalyst composition. Such catalysts should also be of relatively uniform particle size, with a minimum amount of fines. The present invention is particularly directed to methods for the preparation of gel-type catalysts containing active silica, which catalysts are substantially free from compounds of alkali metals and are of relatively uniform particle size. A principal advantage of the invention resides in the fact that gel-type catalysts having these desirable properties can be prepared from such cheap and readily available materials as sodium and potassium silicates by the method thereof, which method is especially adapted for large scale manufacture of cracking catalysts in the quantities commensurate with the extent of the petroleum industry.

Ordinary silica gel is precipitated by acidifying relatively strong solutions of alkali metal silicates with relatively concentrated mineral acids to produce a colloidal solution of silicic acid, and the same procedure is employed for the manufacture of alumina gel and other hydrous oxide gels used as adsorbents. In all cases the concentrations are such that the entire reaction mixture soon sets to a hydrogel, and this hydrogel is washed with hot water to remove the free acid and most of the water-soluble salts. However, it is impossible to remove the alkali metal salts from a hydrogel by this method to the extent necessary for catalytic purposes, and therefore these salts have been removed from the freshly precipitated silicic acid gel by repeated filtration and washing. This has proven to be a tedious and expensive procedure, for the filtration rate of aqueous suspensions of ordinary gelatinous silica is extremely slow. Moreover, the alkali metal ions are adsorbed so strongly by the continuous coating of gelatinous silica on a filter that large quantities of wash water are necessary for their removal, and the slow rate of penetration of the wash water through a filter cloth coated with a layer of gelatinous silica has increased still further the difficulties encountered in operating this process on a large scale.

We have discovered that an aqueous suspension of hydrous oxides consisting of or containing gelatinous hydrated silica can be pretreated in such a manner as to facilitate the filtration and washing thereof without impairing the activity of gels produced when the hydrated silica is dried and calcined. The most important feature of our pretreatment is referred to hereinafter as a flocculation step and the silica so treated is referred to as flocculated silica, but it should be understood that these terms refer to the condition and behavior of the silica or other hydrated metal oxide during the dewatering and washing thereof rather than to any noticeable change in the aqueous suspensions after the flocculating agent has been added. In practicing our invention we subject the aqueous suspensions containing gelatinous hydrated silica to a conditioning procedure which does not materially change the density, appearance or degree of dispersion of the hydrated silica particles in the aqueous slurry, but which so modifies these particles that they form a relatively thick, porous filter cake of good mechanical strength instead of the ordinary thin, slushy filter cakes that are obtained when ordinary gelatinous silica suspensions are filtered. We believe that the water-dispersible adhesive colloids hereinafter referred to as flocculating agents operate to modify in some way the electric charge on the hydrated silica particles in suspension, but the advantages of our invention are not limited by this theory of operation and the results obtained may be due partly or even wholly to other causes.

The flocculating agents which modify the gelatinous silica particles in the manner described are preferably added to the aqueous gelatinous silica suspension after the suspension has been aged for a period of time, although definite improvements are noted when the aging step has been omitted. We have found that aging appears to aid materially in obtaining a relatively thick and porous filter cake; in fact, we have noted some improvements in the filtration and washing of slurries of gelatinous hydrated silica which had been aged for 1–2 hours, but to which no flocculating agent was added. Our invention in its broader aspects therefore includes the combined steps of aging followed by filtration as one of its important features.

A number of important advantages are obtained by preconditioning pulps or slurries of gelatinous hydrated silica in the manner described above, prior to the dewatering thereof. We have found that inorganic salts such as sodium sulfate, sodium nitrate, sodium chloride and the like can be more rapidly and completely removed from a flocculated silica slurry by washing as well as by filtration, and the silica can therefore be dewatered by any suitable procedure. Moreover, flocculation of the hydrated silica also results in a final dried product of much greater uniformity in particle size, as compared with the irregular size of the particles obtained by drying hydrogels of silica or silica and alumina obtained by the ordinary methods heretofore employed. Our invention in its broader aspects therefore includes the dewatering and washing of flocculated silica by any suitable method including filtration, settling and decantation, thickening and the like.

The application of these discoveries to an improved method for the manufacture of gel-type catalysts suitable for use in hydrocarbon cracking and conversion reactions will be illustrated by the following description of a preferred method of catalyst manufacture with reference to the accompanying drawing. This drawing is a flow sheet in which the details of our preferred process are diagrammatically illustrated by tanks, filters and flow lines, but it should be understood that the invention in its broader aspects is not limited thereto.

In carrying out the process illustrated in the drawing we first prepare a dilute solution of sodium or potassium silicate in a mixing tank 1, which is provided with a suitable high-speed impellor-type or turbine type agitator 2 to obtain uniform mixing of the charge. The diluted water glass solution is neutralized with sulfuric, hydrochloric, nitric or other mineral acid to a pH of about 7.4–7.8, after which the agitation is continued for about ½ hour. The amounts and strength of the reagents are such that the solution contains about 5% $SiO_2$.

After the preliminary acidification the contents of tank 1 are discharged into tank 3, which is a correction tank equipped with a suitable agitator and of a size sufficient to permit a retention of the charge for about 75 minutes. At this point it may be stated that except where otherwise noted all the tanks subsequent to tank 1 are equipped with agitators which move very slowly, so that there is no tendency to break up or redisperse gels that have settled or been flocculated. In the tank 3 sufficient additional acid is added to bring the pH to about 7.02–7.8 and sufficient additional water to reduce the $SiO_2$ content to 3.8%.

After suitable retention in the correction tank 3 the gelatinous hydrated silica slurry resulting from the acid addition and dilution is passed to a blending and aging tank 4, wherein it may be aged under slow agitation for any suitable time. Aging of the slurry appears to increase the average particle size of the silica suspension either by agglomeration of the smaller particles or by their adhesion to larger sized particles. It will be noted that tanks 3 and 4 are both provided with side outlets, which permit the retention of about 25% of the aged suspension from a preceding batch to function as a nucleus for particle size growth.

The aged slurry is passed to tank 5, which is a flocculating apparatus in which the silica is flocculated to a condition in which it is ready for filtering and washing to remove the water-soluble alkali metal salts. The slurry in tank 5 is first brought to a pH of 5–6 by the addition of suitable amounts of sulfuric acid or other mineral acid after which a flocculating agent is added. Representative adhesive colloids that we have used with success for this purpose are glue, gelatin, gluten and gluten-containing materials such as wheat flour and the like. These and similar flocculating agents are preferably added as solutions or suspensions in water and are employed in amounts of 0.001% to 0.1%, based on the weight of the slurry.

The flocculating agent is distributed uniformly throughout the hydrated silica suspension in tank 5 by means of slow agitation. The resulting flocculated suspension is then pumped to the distributor box 6, which is a wooden box of relatively large cross-sectional area provided with one or more vertical partitions 7 and adapted to maintain the silica in a flocculated condition while supplying a steady flow of slurry to the filter 8. This may be an ordinary filter press or any other known type of filter, but is preferably a rotary filter of the vacuum drum type provided with fine water sprays for continuous washing of the filter cake, in order to aid in the separation of salts of alkali metals and other undesirable materials from the silica.

On the filter 8 the silica can be washed free from the major part of its water-soluble impurities by wash water which may be acidified with a little sulfuric or hydrochloric acid, the filtration and washing being greatly aided by the flocculation of the silica in the tank 5. In large scale operation the wash water from this and other similar washing steps of the process is preferably regenerated for reuse by contact with a cation-exchange resin such as sulfonated coal, which removes the sodium ions and regenerates free sulfuric acid or hydrochloric acid in the solution. The washed filter cake is then discharged into a repulper 9, which is an enamel-lined vessel fitted with a horizontal agitator 10 which may be a relatively high speed agitator. In the repulper the filter cake is again dispersed in water to form a uniform slurry for further treatment.

In the preparation of catalysts or catalyst carriers consisting essentially of silica the slurry from the repulper 9 may be passed through line 11 to a flocculating and adjusting tank 12 wherein the silica may be aged and flocculated by the addition of a flocculating agent if desired. In preparing mixed catalysts containing the active silica together with other catalytically active metal oxides and/or hydrogels the silica slurry is first passed to one of the two tanks 13 and 14. A solution of aluminum sulfate or other salt of the desired metal is then added to the slurry suspension after which sufficient ammonia is added as ammonium hydroxide to precipitate the hydrated metal oxide from its salts. Thus, for example, in the preparation of a silica-alumina catalyst of the type described in U. S. Patent No. 2,285,314 a solution of aluminum sulfate in water is added to the slurry of silica in the tank 13 under continuous agitation during one-half hour after which 8% aqua ammonia is added during 10-20 minutes to bring the pH to 4.5-5.7. In the preparation of modified catalysts a small amount of zirconium or titanium sulfate may also be added and precipitated. By employing the tanks 13 and 14 in parallel it is possible, of course, to handle a second batch of the semi-purified silica while the alumina or other polyvalent metal is being added to and precipitated in the first batch, and any number of tanks may be employed in this manner in large scale operation.

After the addition and precipitation of alumina or other metal salts in the tanks 13 or 14 the resulting slurry is introduced into the aging and flocculation tank 15. Glue, gelatin or other suitable flocculating agent may be added in approximately the same quantities that were used in the tank 5 if desired, but this is not usually necessary since the hydrated aluminum oxide makes the slurry much easier to filter. In the tank 15 the slurry is preferably adjusted to 4.5-6% solids by the addition of water if necessary, and kept under slow agitation until the hydrated alumina-silica mixture is ready for filtration and washing. It is then passed to the filter 16, which is a rotary filter similar to the filter 8, and the flocculated solids are separated from the accompanying salt solution and washed with acidified water as before.

In order to reduce still further the content of alkali metal salts, ammonium salts, and other undesirable water-soluble material from the silica-alumina mixture, the filter cake is again preferably reslurried in water in a second repulper 17 and again filtered on a rotary filter 18, with or without reflocculation and aging in tank 19 depending on the condition of the solids at this point. The filter cake from the filter 18 may then be reslurried once more in the repulper 20 if desired, brought to a solids content of 5% and a pH of 4.3-5.0 in the tank 21 and filtered on the rotary filter 22 which is washed with water to remove the remaining water-soluble impurities. The filter cake is then removed at approximately 10% solids onto a belt conveyor 23, which discharges it into a calciner 24.

Because of the large quantities of water retained by gelatinous hydrated silica or silica-alumina mixtures a relatively large drier or calciner is necessary. In some cases, however, we have found that the purified gelatinous filter cake can be advantageously dried and calcined by a plurality of drying stages. Thus, for example, we may subject the wet filter cake to hot air or other drying gases by supporting it on a belt or other conveying mechanism which is passed continuously or intermittently through a drier of any suitable type, such as a hot air or steam heated drier. By this means we may remove as much as 40 to 60% of the water in the filter cake, after which the drying of the partially dried gel may be completed in a calciner of the rotary kiln type. Alternatively, the drying may be carried out in one or more rotary kilns, and such a calciner is illustrated on the drawing.

The calciner is preferably direct-fired in a fire box 25 and sufficient capacity is provided to heat the catalyst to temperatures of 1500° F. before it is discharged. The dried material is then ground in a grinder 26 to 40-mesh size and is obtained as a product containing not more than 0.05% $Na_2O$ and little or no $Fe_2O_3$ or other undesirable materials.

The following specific examples are given to show the results obtained by the process of our invention and also to illustrate the importance of certain features of this process.

*Example 1*

In practicing the foregoing process according to one embodiment thereof, 4.36 tons of sodium silicate in the form of commercial waterglass was added to the mixing tank 1 together with 18.4 tons of water, and after completing the dilution 2.2 tons of 24.9% sulfuric acid were added. After agitating for one-half hour the resulting slurry was passed through the correction and aging tanks 3 and 4, as previously described, and 0.015% of glue was added in the flocculating tank 5. After suitable flocculation the solids were then filtered off on the filter 8 and washed with 30.9 tons of water containing sufficient sulfuric acid to reduce the pH of the wash water to 2.8. The washed filter cake was repulped with 9.6 tons of water in the repulper 9 and run into tank 13, where a solution of 0.8 ton of aluminum sulfate in 1.6 tons of water was added. The alum was then precipitated by the addition of 1.87 tons of 8% $NH_4OH$ solution and the resulting slurry was flocculated in the tank 15 by the addition of 0.015% of glue as before. After the following filtration step the cake on the filter 16 was washed with 25.5 tons of water containing sufficient sulfuric acid to reduce its pH to 2.5-3 and repulped in 12.9 tons of water. The same quantities of dilute acid and water were used on the filter 18 and repulper 20, but 21.9 tons of pure water were used to wash the filter cake on the filter 22. After the calcination 1.26 tons of an oil-cracking catalyst were obtained which contained 90% $SiO_2$ and 10% $Al_2O_3$ in a highly active condition.

*Example 2*

52.5 pounds of water and 12.5 pounds of 41° Bé. commercial sodium silicate containing 28.5% $SiO_2$ and 8.9% of $Na_2O$ are run into a mixing tank corresponding to the mixing tank 1 on the drawing. 6.5 pounds of 25% sulfuric acid were added with the agitator 2 at sufficiently high speed to keep the material moving away from the edges of the tank when the mixture became thick. After 30 minutes the resulting mixture was transferred to a tank corresponding to the flocculating tank 5 provided with a slow-moving, gate-type agitator. 24 pounds of water were added along with 0.1-0.3 pounds of 25% sulfuric acid to reduce the pH to 6.8-7.8. The mixture was allowed to age for 2 hours, the pH was reduced to 5.5 by the addition of further quantities of sulfuric acid and a water-solution of glue was added equivalent to 0.015% of glue on the weight of the slurry. After completing the flocculation of the hydrated silica the floc was dewatered on a rotary filter such as an Oliver filter. About 20 minutes were required for the filtration and the filter cake was 0.75 inch thick. The filter cake was washed with water containing a small amount of hydrochloric acid by means of fine sprays at the rate of 2.5–3 gallons of water per pound of $SiO_2$ in the slurry. A sample of the filter cake was then found to contain about 0.2% of sodium on the weight of the $SiO_2$.

Enough water was added to the filter cake to make 70 pounds of slurry. To this slurry was added 2.3 pounds of aluminum sulfate containing 17% of $Al_2O_3$ in the form of 5 pounds of an aqueous solution. Ammonium hydroxide containing 15% of $NH_3$ was then added to bring the pH to 4.2–5.5. The mixture was filtered, the filter cake was washed as before and slurried with enough water to bring the solids content ($SiO_2$ plus $Al_2O_3$) to 4–6% and the mixture was again filtered and washed. This filter cake was again reslurried in water and filtered and the filter cake was washed and thoroughly dewatered. It was then found to contain $Na_2O$ equivalent to only 0.01% of the weight of solids in the sample.

Example 3

A gelatinous hydrated silica slurry was prepared exactly as described in Example 2, but was filtered without the addition of glue. The filter cake was very wet and soft and fell away from the filter cloth when the wash water was applied. For this reason it was difficult to wash the filter cake on a filter of the Oliver type.

Example 4

720 parts by weight of 41° Bé. sodium silicate solution was dissolved in 2600 parts by weight of water and the solution was placed in a kettle equipped with an agitator having three paddles which was rotated at 100 R. P. M. Acid was added in 40 minutes to bring the pH to 3, after which the pH slowly rose to 5.0. It was necessary to add sufficient acid to lower the pH to about 3 in order to neutralize the sodium in the grains of the hydrous $SiO_2$, since these grains vary in size from a few microns to 1/8" in diameter. This slurry would not filter until the pH was increased to 6.5. It then formed a 3/8" cake on the filter but very litle wash water could be passed through the cake. After repeated attempted washings a sample analyzed 1.3% of $Na_2O$, based on the $SiO_2$ content. After reslurrying the filter cake in water a second attempted filtration on the Oliver type filter gave a filter cake only 1/8" thick. The aluminum salt was added to a slurry of this filter cake in water and precipitated with ammonia in the usual manner, but a three hour period was necessary to filter the resulting suspension and only a small amount of wash water could be passed through the filter cake.

Example 5

12.5 lbs. of 41° Bé. sodium silicate containing 8.5% of $Na_2O$ and 28.5% of $SiO_2$ was diluted with 52.5 lbs. of pure water in a mixer of the turbine type (see Chemical Engineering Handbook, p. 1288). 6.5 lbs. of 25% sulfuric acid were added with vigorous agitation during 20–30 minutes, after which the mixer was emptied and washed with 24 lbs. of water containing 0.3–0.4 lb. of 25% sulfuric acid. The wash water was added to the precipitated silica slurry and the mixture was aged for 1.5–2 hours at a pH of 7.0–7.3. A water solution of glue was then added in amounts of 0.01–0.02% of glue and the flocculated hydrous silica was dewatered by filtration. A dried sample of the filter cake contained 0.22% sodium.

The filter cake was washed on the filter with an amount of wash water equal to the original weight of the slurry, sludged up with a little water and aged for 12 hours. It was then diluted with water to 4–6% solids, 5% being the preferred figure, 0.015% of glue was again added, and the silica slurry was again filtered and the filter cake washed with acidified water. The sodium content of a dried sample of the filter cake was 0.02%. The aging, flocculation, filtration and washing was repeated a third time, but in this case no acid was used in the wash water. This reduced the sodium content to 0.01%. The filter cake was then calcined as described in Example 1 and the resulting pure silica catalyst was ground to 4–6 mesh. It was well suited for use as a dehydration catalyst for the production of butadiene from butylene glycols.

What we claim is:

1. A method of preparing a silica-containing catalyst which comprises the steps of neutralizing an aqueous alkali metal silicate solution by the addition of an acid to form an aqueous slurry of gelatinous silica containing alkali metal salts, aging the slurry, adding glue to flocculate the silica, and separating the alkali metal salts by dewatering and washing.

2. A method of preparing a silica-containing catalyst which comprises the steps of neutralizing an aqueous alkali metal silicate solution by the addition of an acid to form an aqueous slurry of gelatinous silica containing alkali metal salts, aging the slurry, adding glue to flocculate the silica, and separating the alkali metal salts by filtering off the flocculated silica and washing the filter cake.

KENNETH D. ASHLEY.
ALPHONS O. JAEGER.